(12) United States Patent
Park et al.

(10) Patent No.: US 10,701,408 B2
(45) Date of Patent: Jun. 30, 2020

(54) DEVICES AND METHODS FOR TRANSMITTING/RECEIVING DATA IN COMMUNICATION SYSTEM

(71) Applicant: Samsung Electronics Co., Ltd., Suwon-si, Gyeonggi-do (KR)

(72) Inventors: Kyung-Mo Park, Seoul (KR); Hyeon-Cheol Pu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/323,592

(22) PCT Filed: Jul. 6, 2015

(86) PCT No.: PCT/KR2015/006968
§ 371 (c)(1),
(2) Date: Jan. 3, 2017

(87) PCT Pub. No.: WO2016/003254
PCT Pub. Date: Jan. 7, 2016

(65) Prior Publication Data
US 2017/0155930 A1    Jun. 1, 2017

(30) Foreign Application Priority Data

Jul. 4, 2014 (KR) .................. 10-2014-0083990

(51) Int. Cl.
*H04N 21/234* (2011.01)
*H04N 21/24* (2011.01)
(Continued)

(52) U.S. Cl.
CPC ....... *H04N 21/234* (2013.01); *H04N 21/2343* (2013.01); *H04N 21/2402* (2013.01);
(Continued)

(58) Field of Classification Search
None
See application file for complete search history.

(56) References Cited

U.S. PATENT DOCUMENTS

| 6,044,079 A * | 3/2000 | Calvignac ........... H04L 12/5601 370/230 |
| 2005/0226196 A1* | 10/2005 | Suh ..................... H04N 21/2662 370/338 |

(Continued)

FOREIGN PATENT DOCUMENTS

| CN | 101026572 A | 8/2007 |
| CN | 101282359 A | 10/2008 |

(Continued)

OTHER PUBLICATIONS

MPEG Media Transport Trend, Apr. 30, 2014, pp. 1-11, http://www.itfind.or.kr/itfind/periodical/viewPublication.htm?page=1&pageSize=10&sortOrder=desc&sort=issued&total=0&searClassCode=B_ITA_01&identifier=02-001-140429-000022&classCode=B_ITA_01_01.

(Continued)

*Primary Examiner* — Ricky Chin
(74) *Attorney, Agent, or Firm* — Jefferson IP Law, LLP

(57) ABSTRACT

The method for transmitting data in a communication system provided by one embodiment of the present disclosure comprises the steps of: determining a data piece which is not to be transmitted, in view of importance information on respective data pieces constituting a data unit to be transmitted; generating an incomplete data indicator indicating that at least one data piece is not transmitted among all of the data pieces constituting the data unit; and transmitting the incomplete data indicator and the data pieces other than the data piece which has been determined not to be transmitted.

6 Claims, 7 Drawing Sheets

(51) Int. Cl.
*H04N 21/845* (2011.01)
*H04N 21/2662* (2011.01)
*H04N 21/2343* (2011.01)
*H04N 21/643* (2011.01)
*H04N 21/85* (2011.01)
*H04N 21/6336* (2011.01)
*H04N 21/854* (2011.01)

(52) U.S. Cl.
CPC ..... *H04N 21/2662* (2013.01); *H04N 21/6336* (2013.01); *H04N 21/64322* (2013.01); *H04N 21/8456* (2013.01); *H04N 21/854* (2013.01); *H04N 21/85406* (2013.01)

(56) References Cited

U.S. PATENT DOCUMENTS

| | | | | |
|---|---|---|---|---|
| 2007/0201365 | A1* | 8/2007 | Skoog | H04L 47/10 370/230.1 |
| 2008/0120424 | A1* | 5/2008 | Deshpande | H04L 47/10 709/230 |
| 2009/0221359 | A1* | 9/2009 | Adiraju | G06F 21/57 463/25 |
| 2010/0122311 | A1* | 5/2010 | Rodriguez | H04N 19/44 725/146 |
| 2010/0189063 | A1* | 7/2010 | Kokku | H04L 47/10 370/329 |
| 2010/0228875 | A1* | 9/2010 | Myers | H04L 65/608 709/231 |
| 2011/0267951 | A1* | 11/2011 | Stanwood | H04L 41/5022 370/235 |
| 2012/0320925 | A1 | 12/2012 | Park et al. | |
| 2014/0007172 | A1* | 1/2014 | Rhyu | H04N 21/2362 725/109 |
| 2014/0032777 | A1* | 1/2014 | Yuan | H04L 67/26 709/231 |
| 2014/0043975 | A1* | 2/2014 | Zhu | H04W 28/02 370/235 |
| 2014/0119648 | A1* | 5/2014 | Park | H04N 21/43637 382/166 |
| 2014/0314080 | A1* | 10/2014 | Park | H04L 47/23 370/391 |
| 2015/0046506 | A1* | 2/2015 | Park | G06F 9/5083 709/201 |
| 2015/0281801 | A1* | 10/2015 | Li | G11B 27/034 725/109 |

FOREIGN PATENT DOCUMENTS

| | | |
|---|---|---|
| CN | 101656756 A | 2/2010 |
| CN | 102232298 A | 11/2011 |
| CN | 103621067 A | 3/2014 |
| CN | 103733679 A | 4/2014 |
| JP | 2002-077240 A | 3/2002 |
| JP | 2004-120609 A | 4/2004 |
| JP | 2011-172153 A | 9/2011 |
| JP | 5335224 B2 | 11/2013 |
| KR | 10-0896688 B1 | 5/2009 |
| KR | 10-1056021 B1 | 8/2011 |
| WO | 2012/161556 A2 | 11/2012 |
| WO | 2014-058276 A | 4/2014 |

OTHER PUBLICATIONS

Chinese Office Action dated Nov. 7, 2018, issued in Chinese Patent Application No. 201580036656.1.
JP Examination Report dated Jan. 22, 2019 issued in JP Patent Application No. 2017-500078.

\* cited by examiner

DEVICES AND METHODS FOR TRANSMITTING/RECEIVING DATA IN COMMUNICATION SYSTEM

TECHNICAL FIELD

The present disclosure relates to a method and apparatus for transmitting and receiving data by using network congestion control in a communication system for multimedia transmission and reception.

BACKGROUND ART

In conventional broadcasting networks, Moving Picture Experts Group-2 Transport Stream (MPEG-2 TS) has been generally used for transmission of multimedia contents. The MPEG-2 TS has been used as a representative transmission technique for transmitting a bitstream in which a plurality of broadcasting programs (multiple encoded video bitstreams) are multiplexed in a transmission environment having an error. For example, the MPEG-2 TS may be suitable for use in digital TV broadcasting in the multimedia era. However, the MPEG-2 TS has several limitations in supporting a multimedia service. More specifically, the MPEG-2 TS has inefficiency in transmission due to unidirectional communication and fixed frame size and unnecessary overhead in transmission due to the use of a transmission protocol and an Internet protocol (IP) that are specific to audio/video. Thus, the MPEG newly proposes the MPEG Media Transport (MMT) standard as one of multimedia transmission technologies for supporting a multimedia service based on the MPEG technology. In particular, the MMT standard has been proposed to overcome the limitations of the MPEG-2 TS.

For example, the MMT standard may be applied to efficiently transmit hybrid contents through a heterogeneous network. Herein, the hybrid contents refer to a set of contents having multimedia elements of video/audio/application/widget, etc. The heterogeneous network means a network in which a broadcast network, a communication network, and so forth coexist.

Moreover, the MMT standard defines a transmission technology that is friendly with the IP that is a basic technique on a transmission network. That is, the MMT standard is intended to provide an efficient MPEG transmission technique in a multimedia service environment that changes based on the IP, and is under standardization with steady research thereon.

DETAILED DESCRIPTION OF THE INVENTION

Technical Problem

Various embodiments of the present disclosure provide a method and apparatus for transmitting/receiving hybrid contents in a communication system.

Various embodiments of the present disclosure provide a method and apparatus for transmitting/receiving hybrid contents in case of network congestion in a communication system.

Various embodiments of the present disclosure provide a method and apparatus for transmitting/receiving hybrid contents by performing a data drop in a communication system.

Various embodiments of the present disclosure provide a method and apparatus for determining data to be dropped in a communication system.

Various embodiments of the present disclosure provide a method and apparatus for notifying a data drop if data is transmitted after the data drop in a communication system.

Technical Solution

A method for transmitting data in a communication system provided in an embodiment of the present disclosure includes determining a data piece that is not to be transmitted, based on importance information of respective data pieces included in a data unit to be transmitted, generating an incomplete data indicator indicating that at least one of the data pieces included in the data unit is not to be transmitted, and transmitting the incomplete data indicator and the other data pieces than the data piece which has been determined not to be transmitted.

A method for receiving data in a communication system provided in an embodiment of the present disclosure includes receiving a data unit including at least one data pieces, receiving an incomplete data indicator indicating that at least one of the data pieces included in the data unit is not to be transmitted, and decoding the other data pieces than the data piece which has been determined not to be transmitted, based on the incomplete data indicator.

An apparatus for transmitting data in a communication system provided in an embodiment of the present disclosure includes a controller configured to determine a data piece that is not to be transmitted, based on importance information of respective data pieces included in a data unit to be transmitted, a data processor configured to generate an incomplete data indicator indicating that at least one of the data pieces included in the data unit is not to be transmitted, and a transceiver configured to transmit the incomplete data indicator and the other data pieces than the data piece which has been determined not to be transmitted.

An apparatus for receiving data in a communication system provided in an embodiment of the present disclosure includes a transceiver configured to receive a data unit including at least one data pieces and an incomplete data indicator indicating that at least one of the data pieces included in the data unit is not to be transmitted and a controller configured to decode the other data pieces than the data piece which has been determined not to be transmitted, based on the incomplete data indicator.

MODE FOR CARRYING OUT THE INVENTION

Figure 1:
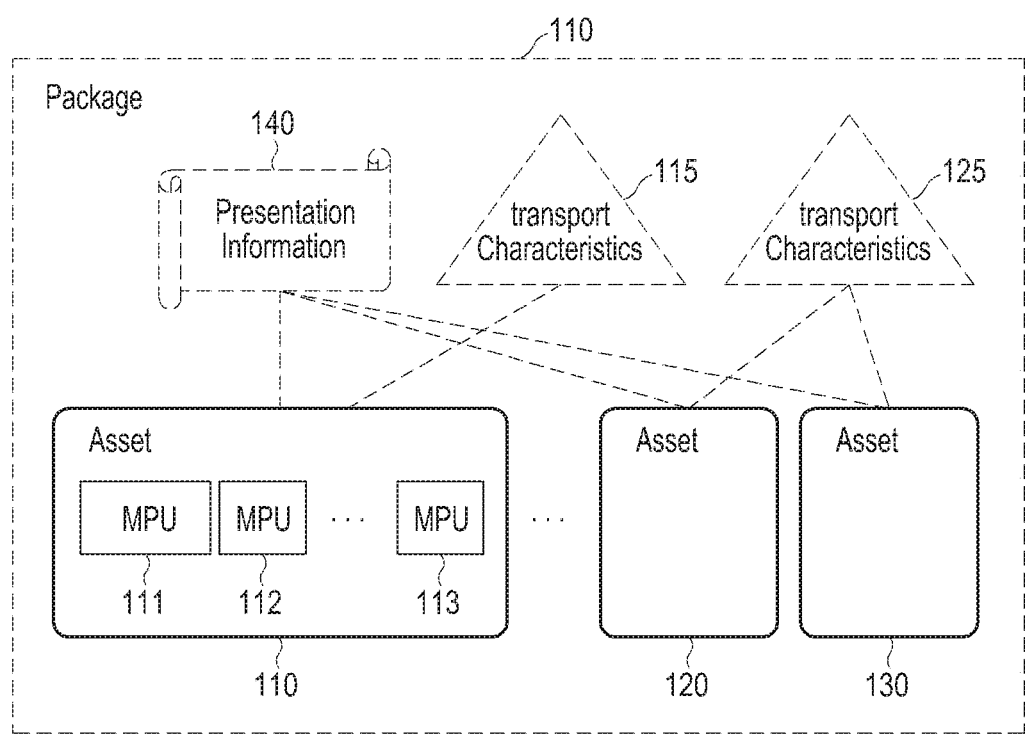
FIG. 1 is a view for describing an MMT data model according to the present disclosure.

In the following description of the present disclosure, a detailed description of well-known functions or elements associated with the present disclosure will be omitted if it unnecessarily obscures the subject matter of the present disclosure. Hereinafter, embodiments will be described with reference to the accompanying drawings.

The following embodiments will be separately described for convenience, but at least two embodiments may be implemented in combination without colliding with each other.

Further, the terminologies to be described below are defined in consideration of functions in the embodiments of the present disclosure and may vary depending on a user's or operator's intention or practice. Therefore, the definitions should be made based on the contents throughout the entire description of the present disclosure.

Various changes may be made to embodiments of the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. Herein, the term "include" or "has" used in the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having the same meanings as the contextual meanings of the relevant technology and should not be interpreted as having ideal or exaggerated meanings unless they are clearly defined in the various exemplary embodiments.

Hereinafter, various embodiments of the present invention will be described in detail with reference to the accompanying drawings. The same elements will be designated by the same reference numerals although they are shown in different drawings. Further, a detailed description of a known function and configuration which may make the subject matter of the present invention unclear will be omitted. In the following description, only parts necessary for understanding of operations according to embodiments of the present disclosure will be described and other parts will not be described not to obscure the subject matter of the present disclosure.

An apparatus and method proposed in the present disclosure may be applied to various communication systems such as a Long-Term Evolution (LTE) mobile communication system, a Long-Term Evolution-Advanced (LTE-A) mobile communication system, a High Speed Downlink Packet Access (HSDPA) mobile communication system, a High Speed Downlink Packet Access (HSDPA) mobile communication system, a High Rate Packet Data (HRPD) mobile communication system of the 3rd-Generation Project Partnership 2 (3GPP2), a Wideband Code Division Multiple Access (WCDMA) mobile communication system of the 3GPP2, a Wideband Code Division Multiple Access (WCDMA) mobile communication system of the 3GPP2, a Code Division Multiple Access (CDMA) mobile communication system of the 3GPP2, the Institute of Electrical and Electronics Engineers: IEEE) 802.16m communication system, an Evolved Packet System (EPS), a Mobile Internet Protocol (Mobile IP) system, and so forth.

Before the present disclosure is described in detail, the main concept of the present disclosure will be described in brief.

When a sending entity desires to transmit data to a reception entity, the sending entity may intentionally omit a portion of the data and transmit only the remaining portion of the data for some reasons. In this case, the sending entity determines data to be omitted among the whole transmission data, taking importance of the transmission data into account. When determining the data to be omitted and transmitting only the remaining data except for the determined data, the sending entity transmits, to the receiving entity, information indicating that the partial data of the whole transmission data is omitted. Thus, even if discovering the omitted partial data among the whole data, the receiving entity may recognize that the sending entity intentionally omits the data. The receiving entity may decode only the currently received data without waiting for reception of the omitted data or requesting retransmission of the omitted data, thereby efficiently using transmission and reception resources. In particular, the present disclosure may be useful for a network congestion situation.

Hereinbelow, embodiments of the present disclosure will be described in detail. The following description will be made based on the MMT standard technologies. However, such a description is for convenience, and the present disclosure is not limited to the MMT standard technologies.

FIG. 1 is a view for describing an MMT data model according to the present disclosure.

In the MMT, a set of encoded media data and metadata related thereto is defined as an MMT flow referred to as a package 100.

The package 100 may include at least one MMT assets 110, 120, and 130, at least one "transport characteristics" or "asset delivery characteristics (ADC)" 115 and 125 information, and at least one presentation information (PI) 140. For reference, the MMT asset means multimedia data that may be used to generate multimedia presentation such as video, audio, texts, files, widgets, etc.

The respective MMT assets 110, 120, and 130 may be divided into at least one media processing unit (MPU). In FIG. 1, the MMT asset #1 110 is illustrated as being divided into a plurality of MPUs 111, 112, . . . , 113. The MPU is a unit in which an MMT stream is independently processed, i.e., transmitted or decoded. One MPU may be divided into a plurality of pieces, each of which is referred to as an "MPU fragment unit (MFU)".

An MMT sending entity divides and processes media data MPU-by-MPU, and an MMT receiving entity receives media data and processes the media data for reproduction MPU-by-MPU.

The transport characteristic information or ADC 115 and 125 may include information for providing a transport characteristic of an MMT asset for each MMT asset. That is, the ADC 115 indicates a transport characteristic of the asset #1 110, and the ADC 125 indicates a transport characteristic of the assets #2 120 and #3 130.

The PI 140 may include information describing time and space relationships among the plurality of assets 110, 120, and 130.

Figure 2:
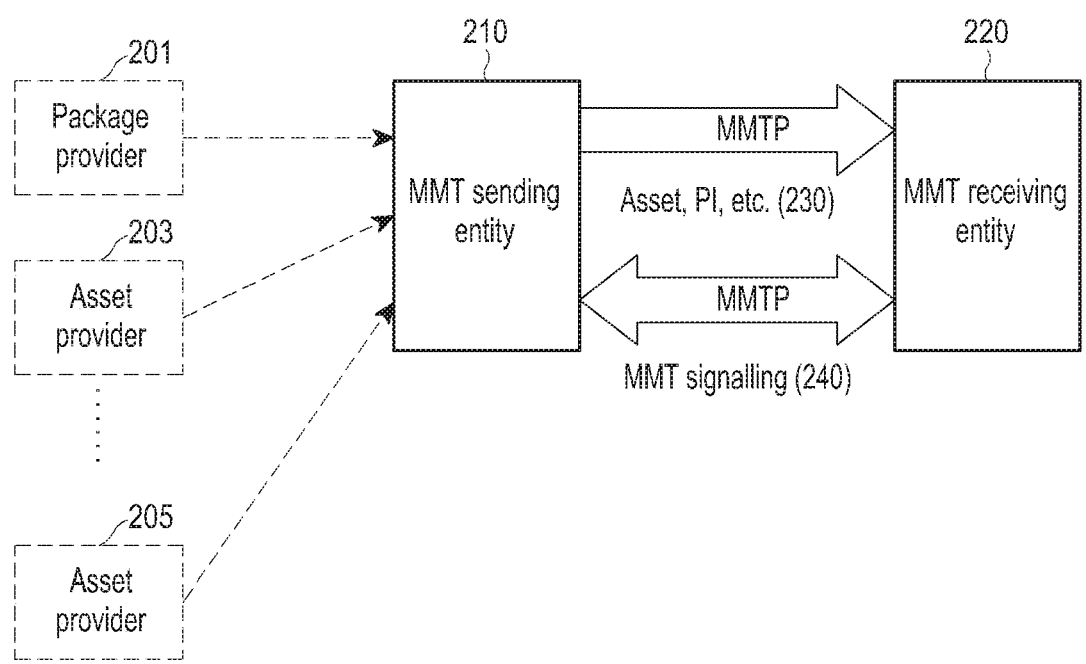
FIG. 2 is a view for schematically describing transmission and reception of an MMT package by an MMT sending entity and an MMT receiving entity according to the present disclosure.

FIG. 2 is a view for schematically describing transmission and reception of an MMT package by an MMT sending (or transmitting) entity 210 and an MMT receiving entity 220 according to the present disclosure.

The MMT sending entity 210 (hereinafter, referred to as a "sending entity" 210) transmits a package as MMT packet flows to the MMT receiving entity 220 (hereinafter, referred to as a "receiving entity" 220). The sending entity 210 may be an arbitrary entity that transmits MMT media data, for example, an MMT broadcast server. The receiving entity 220 may be an arbitrary entity that receives MMT media data, for example, a terminal or a user equipment (UE) that is an MMT client.

If the sending entity 210 is an MMT broadcast server and the receiving entity 220 is a UE, the MMT broadcast server transmits MMT media data to the UE via a base station or a network entity that performs a similar function. The network entity that performs a function that is similar with the base station may be, for example, an access point (AP) of a wireless local area network (WLAN) system. However, for convenience, the "base station" may be used as a concept including a base station of a cellular communication system and the AP of the WLAN communication system. However, the base station is not illustrated in FIG. 2.

The sending entity 210 collects contents from asset providers 203 and 205 based on PI of a package provided by a package provider 201. Herein, the package provider 201 and the asset providers 203 and 205 may be physically located together.

The sending entity 210 transmits a package including an asset, transport specific information, and presentation information by using an MMT protocol (MMTP) in operation 230. The sending entity 210 and the receiving entity 220 transmit and receive signaling information by using the MMTP in operation 240. A signaling message is transmitted and received to manage delivery and consumption of the package.

For reference, the MMTP will be described in brief. The MMTP is an application layer transport protocol for packetizing and transmitting the MMT package, and is designed to efficiently and reliably transmit the package. The MMTP has improved features such as media multiplexing and network jitter calculation. These features allow efficient transmission of contents configured with media data encoded as various types. The MMTP may operate on an existing network protocol, for example, an upper layer of an UDP or the IP. The MMTP is designed to support various applications.

Figure 3:
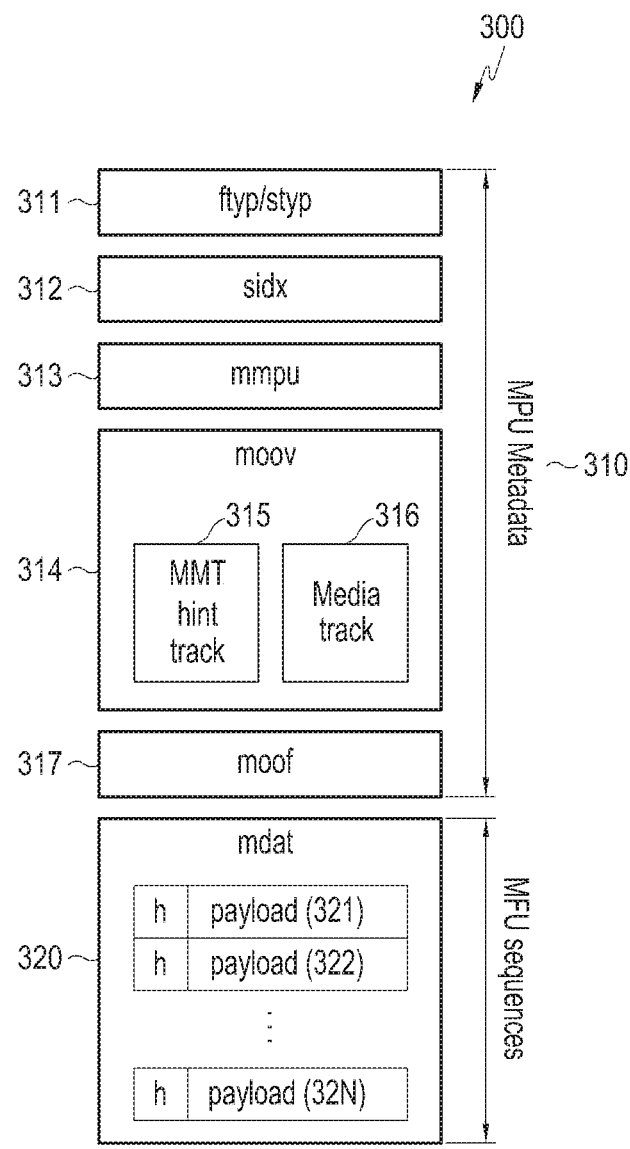
FIG. 3 is a view for describing an International Standardization Organization (ISO)-based media file format in which a media processing unit (MPU) according to the present disclosure is encapsulated.

FIG. 3 is a view for describing an ISO-based media file format in which an MPU according to the present disclosure is encapsulated.

One MPU is encapsulated according to an ISO-based media file format. An MPU file 300, which is an ISO-based media file where an MPU is encapsulated, may include MPU metadata 310 including information of the MPU metadata and an mdat box 320 including at least one MFUs 321, 322, . . . , 32N) divided from MPU media data. Each MFU may include an MFU payload and an MFU header h.

The MPU media file 310 may include a fytp box 311, a sidx box 312, an mmpu box 313, a moov box 314, and a moof box 317. The fytp box 311 may include type information of media data, and the sidx box 312 may include index information of fragments of an MPU.

The mmpu box 313 may include an identifier of an asset to which a current MPU belongs and other information about the current MPU. In particular, the mmpu box 313 may include information ("is complete") indicating whether the current MPU includes all MFUs.

The moov box 314 may include any codec configuration information for decoding and presentation of media data. More specifically, the moov box 314 may include at least one media track 316 and an MMT hint track 317 for MFUs.

The MMT hint track 317 may include information necessary for converting the media file 300 including the MPU into a media stream packetized using a transport protocol such as the MMTP. That is, the MMT hint track 317 may include information necessary for generating a plurality of MFUs forming one MPU. In particular, the MMT hint track 317 may include priority information ("priority") of an MFU for the other MFUs included in one MPU and information ("dependency counter") about the number of MFUs decoded with reference to the MFU.

Figure 4:
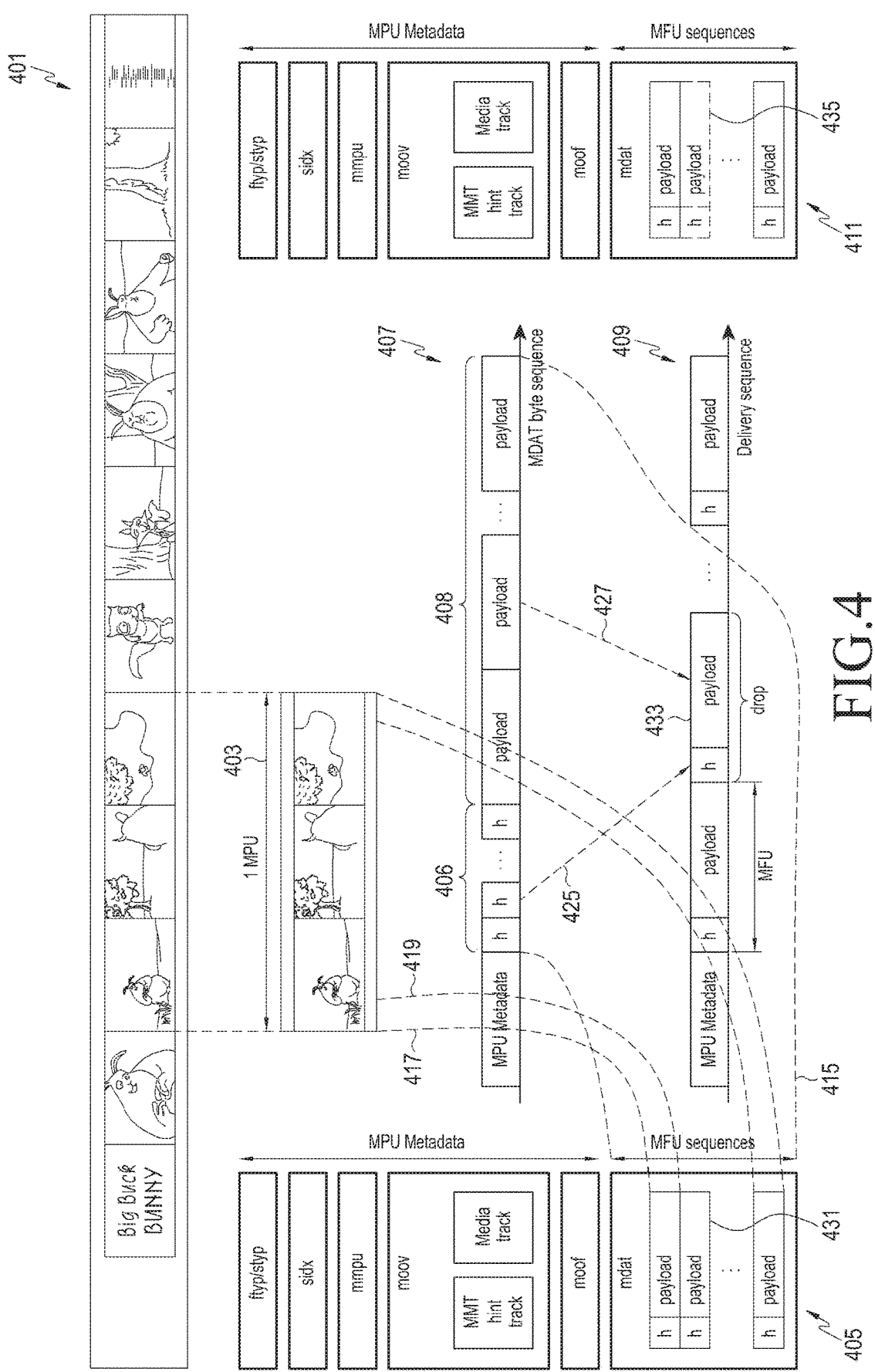
FIG. 4 is a view for describing congestion control between a sending entity and a receiving entity according to the present disclosure.

FIG. 4 is a view for describing congestion control between the sending entity 210 and the receiving entity 220 according to the present disclosure.

With reference to FIG. 4, a description will be made of a process of encapsulating one MPU media data 403 of one video asset 401 as an ISO-based MPU file 403 by the sending entity 210, transmitting an MMT file 405 by using an MMTP as in 409, and receiving an MPU file by the receiving entity 220. However, with reference to FIG. 4, a description will be made of a case where congestion control according to the present disclosure is performed due to occurrence of network congestion.

Herein, network congestion refers to a situation where a channel capacity on a channel path from an MMT broadcast server that generates an MMT package to a UE fails to support a channel capacity based on system designing. For example, assuming that a system channel capacity of a path to a base station is 100 Mbps and a radio channel capacity from each base station to a UE is 75 Mbps, if an arbitrary base station is broken down, even when a broadcast server detours a base station that is different from a currently broken-down base station, a particular service such as a streaming service may have to be transmitted with lower capacity than system configuration capacity. In this case, the broadcast server transmits MFUs other than some MFUs among an MPU to provide a streaming service. For the streaming service, a user may receive the whole media data service even if certain media data is omitted, such that this scheme may be used in case of network congestion. A scheme to provide a service for network congestion is referred to as congestion control.

However, the MMTP does not specify a detailed scheme for congestion control and leaves the congestion control as an issue in implementation. The present disclosure proposes a scheme for performing congestion control in case of traffic congestion in the MMTP.

Referring to FIG. 4, reference numeral 401 indicates one video asset. As described above, one package includes at least one asset such as an audio asset, a video asset, a widget asset, and so forth.

The asset 401 may include at least one MPU, and reference numeral 403 indicates scenes corresponding to one MPU. Reference numeral 405 indicates one MPU file corresponding to the scenes 403. The MPU file 405 is completely identical to the MPU file 300 shown in FIG. 3. As mentioned above, the MPU file 405 includes boxes forming MPU metadata and an mdat box including at least one MFU.

Reference numeral 407 indicates an order in which MFU payloads and MFU headers are encapsulated in the mdat box in the MPU file 405. That is, in reference numeral 407, MFU headers indicated by "h" are arranged together (406), and MFU payloads indicated by "payload" are arranged together behind the MFU headers (408).

Reference numeral 409 indicates an order in which the MPU file 403 is transmitted by the MMTP after encapsulated s indicated by 407. That is, the MPU metadata is transmitted first, and then, respective MFUs including an MFU header and an MFU payload are sequentially transmitted.

If a network state is in a congested state for some reasons, the present disclosure transmits the remaining MFUs except for at least one MFU included in the MPU file 405. In FIG. 4, it is assumed that the second MFU 431 of the MPU file 405 is excluded. That is, if there is no critical problem in the entire service in spite of exclusion of some MFUs from one MPU, in case of a bad network state or UE state, those MFUs are not transmitted to adaptively adjust a data rate depending on a network state or a UE state.

However, it is important to determine which MFUs among a plurality of MFUs of one MPU are to be excluded. An importance of each MFU may differ from MFU to MFU, such that which MFU is to be omitted may have an influence upon the decoding performance or service quality of a reception side.

In the present disclosure, the sending entity 210 determines MFUs that are not to be transmitted, based on importance information of a plurality of MFUs of one MPU. Herein, "importance information" indicates the degree of importance of an MFU in comparison to other MFUs in an MPU. In the present disclosure, the importance information includes at least one of "priority" and "dependency counter".

For example, if an MFU is an essentially necessary MFU in processing of an MPU, such as decoding, an importance of the MFU may be set high. In another example, if the MFU corresponds to a random access point needed for a user's random access to multimedia data, the importance of the MFU may be set high. In these examples, the importance may be "priority".

In another example, as the number of other MFUs to be decoded with reference to an MFU increases, an importance of the MFU may be high. In a video image, an MPEG video format image includes an I frame, a P frame, and a B frame, in which the P frame and the B frame refer to the I frame. The I frame may be used as a random access point. That is, an importance of the I frame is higher than that of the B frame or the P frame. Thus, an MFU corresponding to the I frame has a high importance. In this example, importance information may be "dependency counter".

In the present disclosure, the sending entity 210 separately determines an MFU-specific importance based on MFU-specific characteristics. For example, for a video asset, importance values of MFUs corresponding to an I frame, a B frame, a P frame, and control information of video, respectively, may be determined according to a corresponding frame or control information. In another way, in the present disclosure, an importance of an MFU may be determined using a message defined in an existing MMT standard.

An example of using a message defined in the MMT standard is described below.

As described with reference to FIG. 3, the MMT hint track 317 includes "priority" indicating a priority of an MFU with respect to the other MFUs and information about the number of MFUs to be decoded with reference to the MFU, i.e., "dependency counter" which is dependency counter information. In the present disclosure, importance information of an MFU may be determined using "priority" or "dependency counter" defined in the MMT standard. That is, in the present disclosure, importance information of an MFU includes "priority" or "dependency counter" of an MFU, and the "priority" or the "dependency counter" may be known from "priority" or "dependency counter" defined in the MMT standard. For example, for a video asset, an importance of a frame or control information may be determined using "priority" or "dependency counter" of MFUs corresponding to an I frame, a B frame, a P frame, and control information of video.

As such, the sending entity 210 may determine at least one MFU that is not to be transmitted, i.e., is to be dropped, from among MFUs of an MPU based on importance information of the MFU. The sending entity 210 transmits an MPU including the other MFUs except for the MFUs determined to be dropped. In this case, the receiving entity 220 fails to receive an MFU that is dropped by the sending entity 210, and the receiving entity 220 may not recognize whether an MFU the receiving entity 220 fails to receive is intentionally dropped by the sending entity 210 or is lost on the network even if being transmitted by the sending entity 210.

In the present disclosure, to indicate that the sending entity 210 transmits an MPU after intentionally dropping at least one MFU, the sending entity 210 includes information or an indicator indicating that the MFU in the MPU is dropped. Such information will be referred to as an "incomplete MPU indicator".

In the present disclosure, a message having a new format not included in the existing MMT standard may be defined and used by the incomplete MPU indicator. Also, in the present disclosure, a message having a format included in the existing MMT standard may be used as an incomplete indicator.

As an example of using a message according to the existing MMT standard, the present disclosure uses an "is complete" message. As described above with reference to FIG. 3, an mmpu box 313 in an MPU metadata 310 includes "is complete" information, and "is complete" indicates whether the current MPU includes all MFUs. In the present disclosure, if the sending entity 210 desires to drop at least one MFU and to transmit an MPU, the sending entity 210 may set a value of the "is complete" message to a predetermined value. As such, by using the "is complete" message, the sending entity 210 indicates to the receiving entity 220 that the sending entity 210 transmits an MPU after dropping at least one MFU.

Referring back to FIG. 4, it is assumed that the sending entity 210 determines to drop a second MFU 431 in an MPU file 405, taking account of importance information of an MFU, that is, at least one of "priority" and "dependency counter" in the MMT hint track 317.

As indicated by reference numeral 407, MFU headers 406 and MFU payloads 408 are sequentially arranged in an mdat box in the MPU file 405, but if desiring to transmit MFUs using an MMTP, the sending entity 210 drops a second MFU header 425 and a second MFU payload 427 and then transmits the other MFUs as indicated by 409. In the present disclosure, to indicate that at least one MFU of an MPU has been dropped, the "incomplete MPU indicator" is set or included in MPU metadata. That is, in an mmpu box in the MPU metadata, "is complete" is set to a specific value.

The receiving entity 220 receives an MPU from which the second MFU has been dropped, and recovers an MPU file 411 from which the MFU has been dropped. Once detecting an incomplete MPU indicator from the mmpu box in the MPU file 411, the receiving entity 220 may recognize that at least one MFU has been dropped from the MPU. That is, if "is complete" in the mmpu box in the MPU file 411 is set to a particular value, the receiving entity 220 may recognize that at least one MFU has been dropped from the MPU.

Figure 5:
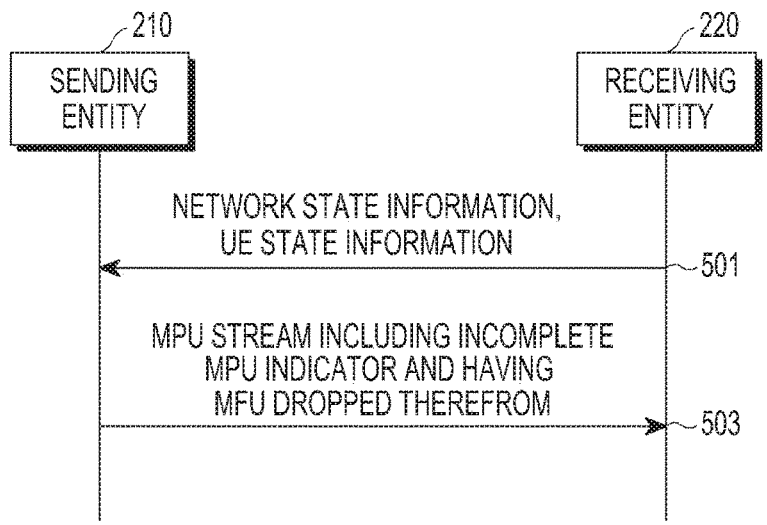
FIG. 5 is a view for describing message transmission and reception between a sending entity and a receiving entity according to the present disclosure.

FIG. 5 is a view for describing message transmission and reception between the sending entity 210 and the receiving entity 220 according to the present disclosure.

The sending entity 210 may be an MMT server, and the receiving entity 220 is assumed to be an MMT client, e.g., a UE. However, generally, a base station exists between the sending entity 210 and the receiving entity 220.

Although each process of FIG. 5 has been described for each operation, operations may not be performed in a described order unless they do not contradict or collide with each other. Depending on cases, some operations may be omitted.

In operation 510, the receiving entity 220 transmits at least one of network state information and UE state information to the sending entity 210. The receiving entity 220 may generate the UE state information indicating a state of the UE. The receiving entity 220 may generate network state information by measuring a radio channel state between the receiving entity 220 and the base station. The receiving entity 220 transmits the network state information and/or the UE state information to the sending entity 210 via the base station. Depending on cases, the network state information or the UE state information may be generated by the base station and transmitted to the sending entity 210 without involvement of the receiving entity 220.

For reference, the network state information may include an available bitrate, a packet loss ratio, a delay, jitter, or the like. For example, a delay or a packet loss ratio measured as a result of a real time transport protocol (RTCP), which is a real time control packet transport protocol, or a result measured in a medium access control (MAC) layer of a WLAN or a 3rd Generation Partnership Project (3GPP) RAN may be included in the network state information. The UE state information may include UE capability information, UE buffer state information, or the like.

The sending entity 210 determines whether to perform an MFU drop by using the network state information and/or the UE state information received from the receiving entity 220 or the base station. In another embodiment, the base station may determine an MFU drop based on the network state information and/or the UE state information and instruct the sending entity 210 to perform the MFU drop.

In another embodiment, according to cases, operation 501 is not necessarily performed and may be omitted. That is, the sending entity 210 does not have to determine an MFU drop based on information received in operation 501 and may determine the MFU drop according to its judgement.

Once the sending entity 210 determines to perform the MFU drop, the sending entity 210 determines an MFU to be dropped in an MPU based on an importance of the MFU. That is, at least one MFU to be dropped is determined, taking at least one of "priority" and "dependency counter" in the MMT hint track 317 into account.

Once determining the MFU to be dropped, the sending entity 210 includes an incomplete MPU indicator in an MPU file and transmits an MPU from which the MFU is dropped and which includes the incomplete MPU indicator to the receiving entity 220 in operation 503. That is, in an mmpu box in MPU metadata, "is complete" is set to a specific value.

Figure 6:
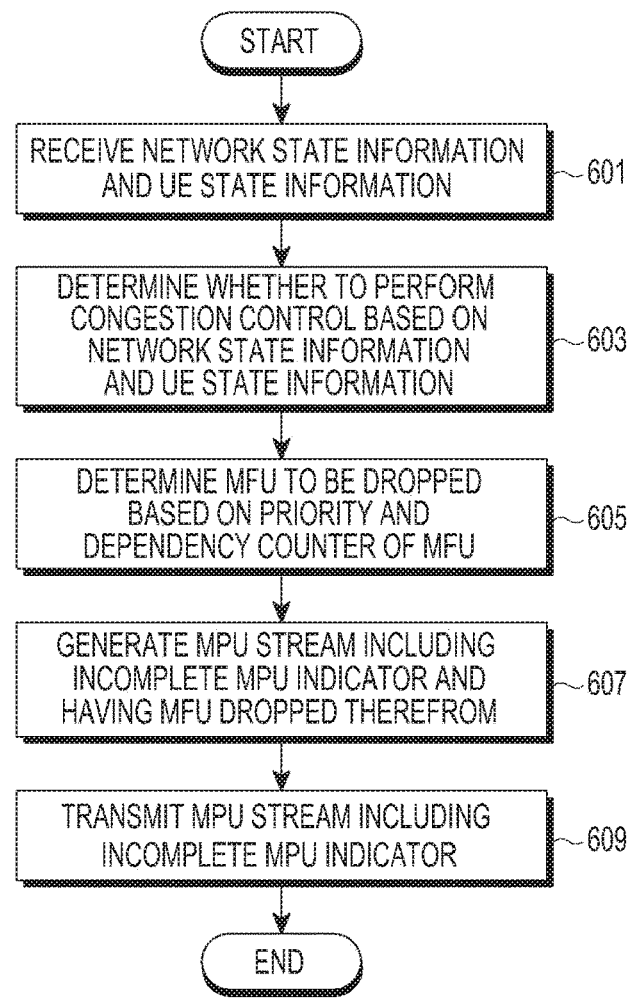
FIG. 6 is a view for describing an operation of a sending entity according to the present disclosure.

FIG. 6 is a view for describing an operation of the sending entity 210 according to the present disclosure.

Although each process of FIG. 6 has been described for each operation, operations may not be performed in a described order unless they do not contradict or collide with each other. Depending on cases, some operations may be omitted.

In operation 601, the sending entity 210 receives network state information and/or UE state information generated by the base station or the UE. However, operation 601 may be omitted. In operation 603, the sending entity 210 determines that the network state is network congestion based on the network state information and/or the UE state information, and determines to perform congestion control. In the present disclosure, the congestion control means an MFU drop. However, depending on cases, the sending entity 210 may receive a congestion control instruction or an MFU drop instruction from the base station or measure a network state and determine an MFU drop based on the measurement.

Since the sending entity 603 determines to perform the MFU drop in operation 603, the sending entity 210 determines an MFU to be dropped in an MPU based on an importance of the MFU in operation 605. That is, the sending entity 210 determines at least one MFU to be dropped, taking at least one of "priority" and "dependency counter" in the MMT hint track 317 into account.

In operation 607, the sending entity 210 includes an incomplete MPU indicator in an MPU file and generates an MPU from which the MFU determined to be dropped is excluded. That is, the MPU is generated by setting "is complete" to a specific value in an mmpu box in MPU metadata. In operation 609, the sending entity 210 transmits the MPU from which at least one MFU is dropped and which includes the incomplete MPU indicator.

Figure 7:
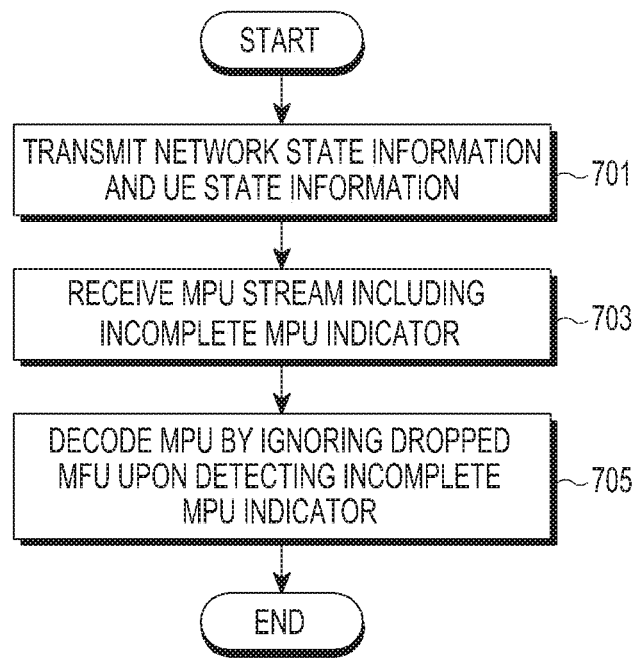
FIG. 7 is a view for describing an operation of a receiving entity according to the present disclosure.

FIG. 7 is a view for describing an operation of the receiving entity 220 according to the present disclosure.

Although each process of FIG. 7 has been described for each operation, operations may not be performed in a described order unless they do not contradict or collide with each other. Depending on cases, some operations may be omitted.

In operation 701, the receiving entity 220 transmits network state information and/or UE state information. However, operation 701 may be omitted. In operation 703, the receiving entity 220 receives an MPU from which at least one MFU is dropped and which includes an incomplete MPU indicator. In operation 705, once detecting the incomplete MPU indicator, the receiving entity 220 decodes the MPU by ignoring the dropped MFU and using the received MFUs to generate media data.

Hereinbelow, a description will be made of an embodiment of the present disclosure when the sending entity 210 is an MMT server, the receiving entity 220 is a UE, and the MMT server transmits an MMT stream via the base station.

Figure 8:
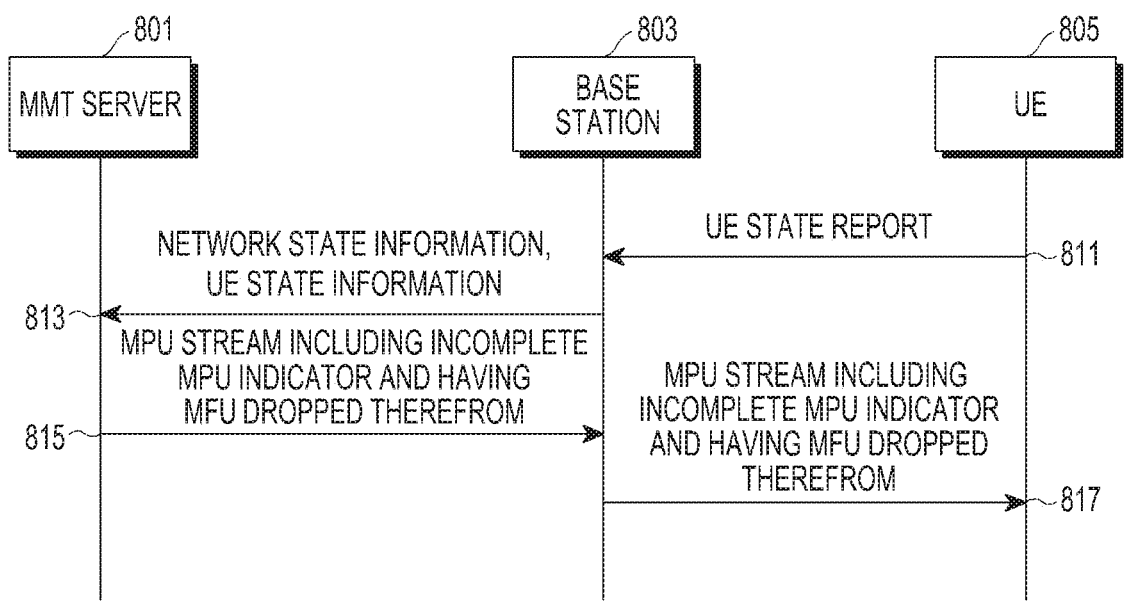
FIG. 8 is a view for describing a message flow among an MMT server, a base station, and a UE according to the present disclosure.

FIG. 8 is a view for describing a message flow among an MMT server 801, a base station 803, and a UE 805 according to the present disclosure.

Although each process of FIG. 8 has been described for each operation, operations may not be performed in a described order unless they do not contradict or collide with each other. Depending on cases, some operations may be omitted.

In operation 811, the UE 805 generates a UE state report and transmits the generated UE state report to the base station 803. In this case, the UE 805 may measure a network state between the UE 805 and the base station 803 and transmits network state information together. However, operation 811 may be omitted.

In operation 813, the base station 803 transmits the UE state information and/or the network state information received from the UE 805 to the MMT server 801. If the base station 803 receives only the UE state information from the UE 805, the base station 803 may measure a network state, generate network state information, and transmit the generated network state information to the MMT server 801.

The MMT server 801 having received the network state information and/or the UE state information determines whether to perform an MFU drop by using the received information. In another embodiment, the base station 803 may determine an MFU drop based on the network state information and/or the UE state information and instruct the sending entity 210 to perform the MFU drop. Once determining to perform the MFU drop, the MMT server 801 determines an MFU to be dropped in an MPU based on an importance of the MFU. That is, the MMT server 801 determines at least one MFU to be dropped, taking at least one of "priority" and "dependency counter" in the MMT hint track 317 into account, and includes an incomplete MPU indicator in an MPU file.

In operation 815, the MMT server 801 transmits an MPU from which the MFU is dropped and which includes the incomplete MPU indicator to the base station 803. That is, in an mmpu box in MPU metadata, "is complete" is set to a specific value. In operation 817, the base station 803 transmits the MPU from which the MFU is dropped and which includes the incomplete MPU indicator to the UE 805.

Thereafter, the UE 805 detects the incomplete MPU indicator from the received MPU and decodes the MPU by ignoring the dropped MFU and using the received MFUs to generate media data.

So far, on the assumption that the sending entity 210 is an MMT server, an MPU transmission and reception scheme of the MMT server based on congestion control has been described. Hereinbelow, an embodiment where a base station performs congestion control will be described with reference to FIG. 9. However, in the embodiment of FIG. 9, it is assumed that the base station receives an MPU from an MMT server and has a function of performing congestion control like the MMT server. Thus, the "base station" described below may indicate a network entity that receives an MPU from the MMT server and performs congestion control to forward the MPU to the UE.

Figure 9:
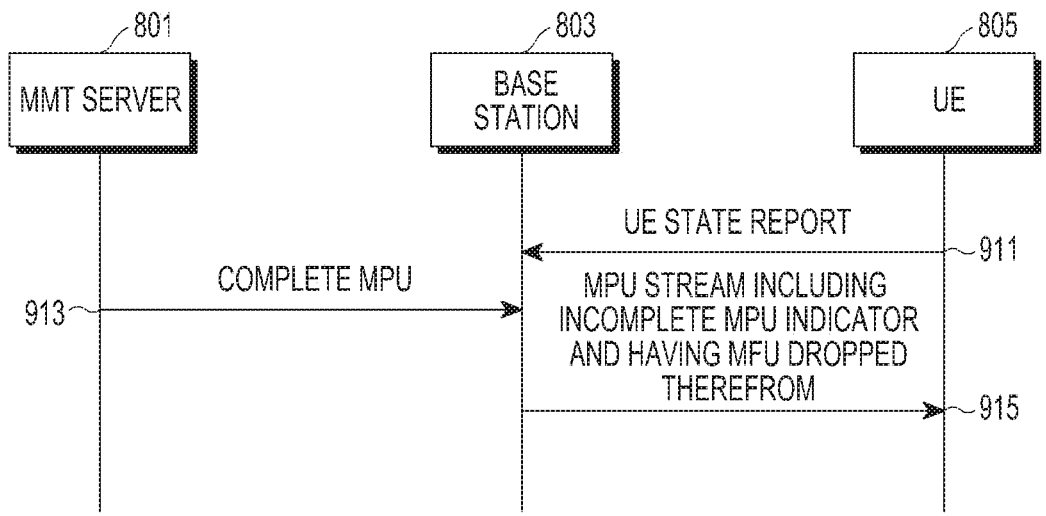
FIG. 9 is a view for describing a message flow among an MMT server, a base station, and a UE when the base station, which is a network entity, performs congestion control of an MPU according to another embodiment of the present disclosure.

FIG. 9 is a view for describing a message flow among the MMT server 801, the base station 803, and the UE 805 when the base station 803, which is a network entity, performs congestion control of an MPU according to another embodiment of the present disclosure.

Although each process of FIG. 9 has been described for each operation, operations may not be performed in a described order unless they do not contradict or collide with each other. Depending on cases, some operations may be omitted.

In operation 911, the UE 805 generates UE state information and transmits the generated UE state information to the base station 803. In this case, the UE 805 may measure a network state between the UE 805 and the base station 803 and transmits network state information together. However, operation 911 may be omitted.

The base station 803 determines whether the network state is network congestion, by using the UE state information and/or the network state information received in operation 911 or network state information measured by the base station 803.

In operation 913, the MMT server 801 transmits the MPU to the base station 803. In this case, the MPU transmitted by the MMT server 801 is a complete MPU from which any MFU is not dropped. Since the base station 803 receives the MPU from the MMT server 801, having already known that the network state is network congestion, the base station 803 may drop an MFU to perform congestion control with respect to the received MPU and determine to forward the MPU to the UE 805. Thus, the base station 803 determines an MFU to be dropped from the MPU based on an importance of the MFU. That is, the MMT server 801 determines at least one MFU to be dropped, taking at least one of "priority" and "dependency counter" in the MMT hint track 317 into account, and includes an incomplete MPU indicator in an MPU file.

In operation 915, the base station 803 transmits the MPU from which the MFU is dropped and which includes the incomplete MPU indicator to the UE 805. That is, in an mmpu box in MPU metadata, "is complete" is set to a specific value. Thereafter, the UE 805 detects the incomplete MPU indicator from the received MPU and decodes the MPU by ignoring the dropped MFU and using the received MFUs to generate media data.

Figure 10:
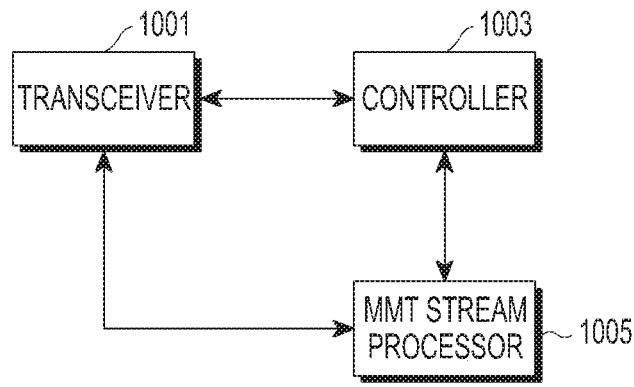
FIG. 10 is a block diagram of a sending entity according to the present disclosure.

FIG. 10 is a block diagram of the sending entity 210 according to the present disclosure.

Although it is general that the sending entity 210 is an MMT as described with reference to FIG. 8, the sending entity 210 may also be a network entity described with reference to FIG. 9 in another embodiment.

The sending entity 210 may include a transceiver 1001, a controller 1003, and an MMT stream processor 1005. The sending entity 210 may be implemented with a combination of at least one of hardware, firmware, and software. As an example of elements of the sending entity 210, the transceiver 1001 may be implemented with a modem, a radio frequency (RF) transceiver, and so forth, and the controller 1003 may be implemented with a processor such as an application processor (AP). The MMT stream processor 1005 may be configured as a part of the controller 1003 or separately from the controller 1003.

The transceiver 1001 transmits and receives a signal to and from other entities. If the sending entity 210 is an MMT server, the transceiver 1001 receives network state information and/or UE state information generated by a base station or a UE and transmits an MPU to the base station or the UE. If the sending entity 210 is a network entity such as a base station, the sending entity 210 receives an MPU from the MMT server.

The controller 1003 controls overall operations according to the present disclosure. Once determining that the network state is network congestion based on the network state information and/or the UE state information, the controller 1003 determines to drop an MFU to perform congestion control. If the sending entity 210 is an MMT server, the sending entity 210 may receive a congestion control instruction or an MFU drop instruction from the base station or determine an MFU drop according to its determination regarding a network state. If the sending entity 210 is a network entity like the base station, the base station may determine the MFU drop.

Once the MFU drop is determined, the MMT stream processor 1005 determines an MFU to be dropped from the MPU based on an importance of the MFU. That is, the MMT stream processor 1005 determines at least one MFU to be dropped, taking at least one of "priority" and "dependency counter" in the MMT hint track 317 into account. The MMT stream processor 1005 also includes an incomplete MPU indicator in an MPU file and generates an MPU from which the MFU determined to be dropped is excluded. That is, the MPU is generated by setting "is complete" to a specific value in an mmpu box in MPU metadata.

Figure 11:
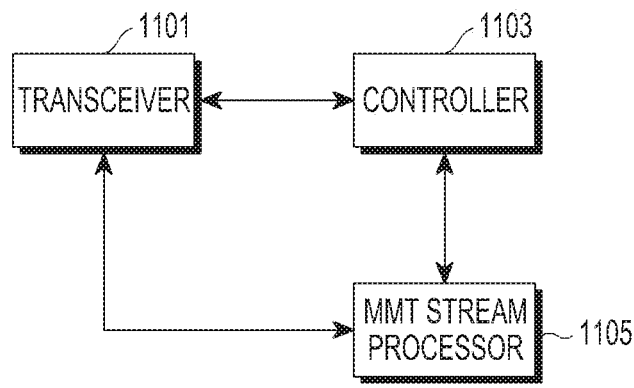
FIG. 11 is a block diagram of a receiving entity according to the present disclosure.

FIG. 11 is a block diagram of the receiving entity 220 according to the present disclosure.

The receiving entity 220 is generally an UE device like the UE.

The receiving entity 220 may include a transceiver 1101, a controller 1103, and an MMT stream processor 1105. The receiving entity 220 may be implemented with a combination of at least one of hardware, firmware, and software. As an example of elements of the receiving entity 220, the transceiver 1101 may be implemented with a modem, an RF transceiver, and so forth, and the controller 1103 may be implemented with a processor such as an AP. The MMT stream processor 1105 may be configured as a part of the controller 1003 or separately from the controller 1003.

The transceiver 1101 transmits and receives a signal to and from the base station. That is, the transceiver 1101 transmits network state information and/or UE state information to the base station and receives an MPU.

The controller 1103 controls overall operations according to the present disclosure. In particular, the controller 1103 detects an incomplete MPU indicator from the received MPU. That is, the controller 1103 determines whether "is complete" is set to a specific value in an mmpu box in MPU metadata. If the incomplete MPU indicator is detected, the controller 1103 controls the MMT stream processor 1105 to decode the MPU with the other MFUs except for the dropped MFU.

Meanwhile, if receiving an incomplete MPU, the receiving entity 220 may know, from mmpu header information, the size of an MFU that is deleted or fails to be received. Thus, the receiving entity 220 fills in the MPU, as much data as the size of the MFU that is deleted or fails to be received.

In this way, a problem is prevented from occurring in decoding. For example, by filling in an MPU, as much "0" as the size of data that fails to be received, an error of stopping decoding by a decoder may be prevented.

Moreover, when an "is_complete" indicator is detected in mmpu, a time required for reconfiguring an MPU may be reduced. This is because, the receiving entity 220 may know in advance that an MPU to be received is incomplete, and thus may receive the MPU for a predetermined time, reassemble the incomplete MPU, and then deliver the MPU to a decoding stage.

The MMT stream processor 1105 recovers the MPU by using the other MFUs except for a dropped MFU to generate media data under control of the controller 1103.

So far, the embodiments of the present disclosure have been described in detail. According to representative configurations in the embodiments of the present disclosure, reference values of different received signal qualities are applied to different received signals and then the signals are forwarded, thereby efficiently using transmission resources and transmission power, especially, of the UE.

So far, the embodiments of the present disclosure have been described in detail. According to representative configurations in the embodiments of the present disclosure, reference values of different received signal qualities are applied to different received signals and then the signals are forwarded, thereby efficiently using transmission resources and transmission power, especially, of the UE.

Particular aspects of the embodiments of the present disclosure described so far may also be implemented as a computer readable code in a computer readable recording medium. The computer readable recording medium may be any type of data storage device that may store data readable by a computer system. Examples of record-mediums readable by the computer may include a Read-Only Memory (ROM), a Random-Access Memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such arbitrary software may be stored, for example, in a volatile or non-volatile storage device (e.g., a ROM, etc.), a memory (e.g., a RAM, a memory chip, a memory device, or a memory IC), or a machine (e.g., computer) recordable optical or magnetic storage medium (e.g., a CD, a DVD, a magnetic disc, a magnetic tape, etc.) regardless of its ability to erase or rewrite. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine (computer)-readable storage medium for storing such a program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

The invention claimed is:

1. A method of transmitting media data, the method comprising:
   identifying, by a media data delivering apparatus, a media processing unit (MPU) encapsulated in an ISO-based media file format (ISOBMFF) based file,
     wherein the MPU comprises a mmpu box including an identifier of an asset to which the MPU belongs and information for the MPU, a moov box including codec configuration information for decoding and presentation of media data associated with the MPU, and a media data box including the media data,
     wherein in case that the MPU is fragmented into one or more media fragment units (MFUs), the moov box further includes at least one MPEG media transport (MMT) hint track for the one or more MFUs, the MMT hint track providing information for a fragmentation of the MPU into the one or more MFUs,
     wherein the MMT hint track includes priority information and dependency counter information, the priority information indicating a priority of a corresponding MFU relative to other MFUs in the MPU and the dependency counter information indicating a number of MFUs of which decoding is dependent on the corresponding MFU, and
     wherein the mmpu box further includes complete information indicating whether or not the MPU comprises all of the one or more MFUs;
   dropping, by the media data delivering apparatus, at least one MFU among the one or more MFUs based on the priority information and the dependency counter information and a network condition;
   setting the complete information as a predetermined value indicating that the at least one MFU in the MPU is dropped; and
   transmitting, by the media data delivering apparatus, the one or more MFUs among which the at least one MFU is dropped and the complete information set as the predetermined value, by using a MMT protocol.

2. The method of claim 1, wherein a media data receiving apparatus decodes the one or more MFUs based on the complete information.

3. A method for receiving media data in a communication system, the method comprising:
   receiving, by a media data receiving apparatus, at least one media fragment unit (MFU) of a media processing unit (MPU) and complete information by using a MPEG media transport (MMT) protocol, the MPU being encapsulated in an ISO-based media file format (ISOBMFF) based file,
     wherein the MPU comprises a mmpu box including an identifier of an asset to which the MPU belongs and information for the MPU, a moov box including codec configuration information for decoding and presentation of media data associated with the MPU, and a media data box including the media data,
     wherein in case that the MPU is fragmented into one or more MFUs, the moov box further includes at least one MMT hint track for the one or more MFUs, the MMT hint track providing information for a fragmentation of the MPU into the one or more MFUs,
     wherein the MMT hint track includes priority information and dependency counter information, the priority information indicating a priority of a corresponding MFU relative to other MFUs in the MPU and the dependency counter information indicating a number of MFUs of which decoding is dependent on the corresponding MFU, and
     wherein the mmpu box further includes the complete information indicating whether or not the MPU comprises all of the one or more MFUs;
   determining, by the media data receiving apparatus, whether the complete information is set as a predetermined value indicating that at least one of the one or more MFUs in the MPU is dropped; and
   decoding, by the media data receiving apparatus, the MPU by using at least one other MFU except the at least one dropped MFU among the one or more MFUs, in case of determining that the complete information is set as the predetermined value,
   wherein the at least one dropped MFU is determined based on the priority information and the dependency counter information and a network condition.

4. An apparatus for delivering media data in a communication system, the apparatus comprising:
   at least one processor configured to:
     identify a media processing unit (MPU) encapsulated in an ISO-based media file format (ISOBMFF) based file,
       wherein the MPU comprises a mmpu box including an identifier of an asset to which the MPU belongs and information for the MPU, a moov box including codec configuration information for decoding and presentation of media data associated with the MPU, and a media data box including the media data,
       wherein in case that the MPU is fragmented into one or more media fragment units (MFUs), the moov box further includes at least one MPEG media transport (MMT) hint track for the one or more MFUs, the MMT hint track providing information for a fragmentation of the MPU into the one or more MFUs,
       wherein the MMT hint track includes priority information and dependency counter information, the priority information indicating a priority of a corresponding MFU relative to other MFUs in the MPU and the dependency counter information indicating a number of MFUs of which decoding is dependent on the corresponding MFU, and
       wherein the mmpu box further includes complete information indicating whether or not the MPU comprises all of the one or more MFUs,
     drop at least one MFU among the one or more MFUs based on the priority information and the dependency counter information and a network condition, and
     set the complete information as a predetermined value indicating that the at least one MFU in the MPU is dropped; and
   a transceiver configured to transmit the one or more MFUs among which the at least one MFU is dropped and the complete information set as the predetermined value, by using a MMT protocol.

5. The apparatus of claim 4, wherein a media data receiving apparatus decodes the one or more MFUs based on the complete information.

6. An apparatus for receiving media data in a communication system, the apparatus comprising:
- a transceiver configured to receive at least one media fragment unit (MFU) of a media processing unit (MPU) and complete information by using a MPEG media transport (MMT) protocol, the MPU being encapsulated in an ISO-based media file format (ISOBMFF) based file,
- wherein the MPU comprises a mmpu box including an identifier of an asset to which the MPU belongs and information for the MPU, a moov box including codec configuration information for decoding and presentation of media data associated with the MPU, and a media data box including the media data,
- wherein in case that the MPU is fragmented into one or more MFUs, the moov box further includes at least one MMT hint track for the one or more MFUs, the MMT hint track providing information for a fragmentation of the MPU into the one or more MFUs,
- wherein the MMT hint track includes priority information and dependency counter information, the priority information indicating a priority of a corresponding MFU relative to other MFUs in the MPU and the dependency counter information indicating a number of MFUs of which decoding is dependent on the corresponding MFU, and
- wherein the mmpu box further includes the complete information indicating whether or not the MPU comprises all of the one or more MFUs;
- at least one processor configured to determine whether the complete information is set as a predetermined value indicating that at least one of the one or more MFUs in the MPU is dropped; and
- a decoder configured to decode the MPU by using at least one remaining MFU except the at least one dropped MFU among the one or more MFUs, in case of determining that the complete information is set as the predetermined value,
- wherein the at least one dropped MFU is determined based on the priority information and the dependency counter information and a network condition.

* * * * *